US012695848B2

(12) United States Patent
Kim et al.

(10) Patent No.: US 12,695,848 B2
(45) Date of Patent: Jul. 28, 2026

(54) VIDEO SEARCH DEVICE AND NETWORK SURVEILLANCE CAMERA SYSTEM INCLUDING SAME

(71) Applicant: HANWHA TECHWIN CO., LTD., Seongnam-si (KR)

(72) Inventors: Dong Won Kim, Seongnam-si (KR); Chung Jin Son, Seongnam-si (KR); Hyun Kyu Park, Seongnam-si (KR)

(73) Assignee: Hanwha Vision Co., Ltd., Seongnam-si (KR)

( * ) Notice: Subject to any disclaimer, the term of this patent is extended or adjusted under 35 U.S.C. 154(b) by 470 days.

(21) Appl. No.: 17/798,088

(22) PCT Filed: Feb. 18, 2021

(86) PCT No.: PCT/KR2021/002076
§ 371 (c)(1),
(2) Date: Aug. 8, 2022

(87) PCT Pub. No.: WO2021/167374
PCT Pub. Date: Aug. 26, 2021

(65) Prior Publication Data
US 2023/0093631 A1     Mar. 23, 2023

(30) Foreign Application Priority Data

Feb. 18, 2020     (KR) ........................ 10-2020-0019410

(51) Int. Cl.
| | |
|---|---|
| *G06V 20/52* | (2022.01) |
| *G06F 16/738* | (2019.01) |
| *G06F 16/78* | (2019.01) |
| *G06V 20/40* | (2022.01) |

(52) U.S. Cl.
CPC ........... *H04N 7/181* (2013.01); *G06F 16/738* (2019.01); *G06F 16/7867* (2019.01);
(Continued)

(58) Field of Classification Search
CPC ...................................................... G06V 20/52
See application file for complete search history.

(56) References Cited

U.S. PATENT DOCUMENTS

| | | | |
|---|---|---|---|
| 2005/0257169 A1* | 11/2005 | Tu ........................ | G06F 3/0481 |
| | | | 715/810 |
| 2008/0086688 A1* | 4/2008 | Chandratillake ..... | G06F 16/738 |
| | | | 707/E17.028 |

(Continued)

FOREIGN PATENT DOCUMENTS

| | | |
|---|---|---|
| JP | 2011-223326 A | 11/2011 |
| KR | 10-2009-0012018 A | 2/2009 |

(Continued)

OTHER PUBLICATIONS

International Search Report for International application No. PCT/KR2021/002076 issued on Apr. 22, 2022.

*Primary Examiner* — Frank Johnson
(74) *Attorney, Agent, or Firm* — McLean IP Global; Jason Y. Pahng

(57) ABSTRACT

A network surveillance camera system includes a plurality of cameras configured to photograph a plurality of surveillance areas to acquire video information for the respective surveillance areas and transmit the acquired video information of each surveillance area to each channel, and a video receiving/search device connected to the plurality of cameras via a network and configured to receive the video information from the cameras in real time and search for the transmitted multi-channel video information, wherein the video receiving/search device includes a video search viewer configured to generate a thumbnail image and a metadata tag corresponding to an event of each channel based on video analysis information for each of the chan- (Continued)

nels, display the generated thumbnail image and metadata tag, and search for the transmitted multi-channel video information.

16 Claims, 9 Drawing Sheets

(51) Int. Cl.
  *H04N 7/18*       (2006.01)
  *G06F 3/0482*     (2013.01)
(52) U.S. Cl.
  CPC .............. *G06V 20/44* (2022.01); *G06V 20/49* (2022.01); *G06V 20/52* (2022.01); *G06F 3/0482* (2013.01); *G06F 2203/04803* (2013.01); *G06V 2201/10* (2022.01)

(56)                References Cited

U.S. PATENT DOCUMENTS

| | | | | |
|---|---|---|---|---|
| 2013/0091432 A1* | 4/2013 | Shet | ........................ | G06F 16/73 |
| | | | | 715/719 |
| 2017/0294213 A1* | 10/2017 | Brauckmann | ....... | G06F 16/7844 |
| 2018/0115788 A1* | 4/2018 | Burns | .................... | G06V 20/52 |
| 2021/0133456 A1* | 5/2021 | Lee | ......................... | G06F 18/21 |

FOREIGN PATENT DOCUMENTS

| | | | |
|---|---|---|---|
| KR | 10-2013-0124767 A | 11/2013 |
| KR | 10-2002360 B1 | 7/2019 |
| KR | 10-2039279 B1 | 10/2019 |

* cited by examiner

VIDEO SEARCH DEVICE AND NETWORK SURVEILLANCE CAMERA SYSTEM INCLUDING SAME

This application is a national stage application, filed under 35 U.S.C § 371, of international patent application number PCT/KR2021/002076, filed on Feb. 18, 2021, which is hereby incorporated by reference in its entirety. In addition, this application claims priority from Korean application number 10-2020-0019410, filed on Feb. 18, 2020, which is hereby incorporated by reference in its entirety.

TECHNICAL FIELD

The present disclosure relates to a network surveillance camera system, and more particularly, to a video search device to display thumbnails and metadata tags corresponding to videos received for each channel, and a network surveillance camera system including the same.

BACKGROUND ART

A modern surveillance camera system may transmit a variety of video analysis information acquired in a surveillance area together with video and audio signals using a network camera that performs an intelligent video analysis.

The network-based surveillance camera system may include a network surveillance camera and a video receiving device such as a digital video recorder (DVR) or a network video recorder (NVR) that receives information acquired from the network surveillance camera via a media streaming method using RTP/RTSP. In that case, the information transmission method adopts a standard protocol via a video surveillance standardization organization such as ONVIF. Real Time Streaming Protocol (RTSP) is a standard communication protocol (RFC2326) developed by IETF and may be used to remotely control a media server. In order to transmit media streaming data including real video and audio, Real-Time Transport Protocol (RTP) can be used together as a transport layer.

In a conventional network-based surveillance camera system, videos of each channel from each surveillance camera can be monitored via a display of the video receiving device; however, a screen is divided for each channel, and it is difficult to intuitively control which channel of the plurality of divided screens has a high frequency of occurrence of the event.

Furthermore, in order to compare the frequency of event occurrence for each channel, new windows (event logs, dashboards, etc.) need to be deployed, and because thumbnails are not provided in the comparison, it is difficult to check and compare each event occurrence in order to determine the relationship with the captured images.

DISCLOSURE

Technical Problem

The present disclosure provides a video search device and a network surveillance camera system including the same that can receive a surveillance video transmitted from a plurality of network cameras and video analysis information corresponding to the surveillance video, generate thumbnails and metadata tags for each channel using the video analysis information, display the thumbnails and the metadata tags for each channel on a video search viewer, and provide a user with the convenience of searching.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

Technical Solution

The present disclosure describes a network surveillance camera system, comprising: a plurality of cameras configured to photograph a plurality of surveillance areas to acquire video information for the respective surveillance areas and transmit the acquired video information of each surveillance area to each channel; and a video receiving/search device connected to the plurality of cameras via a network and configured to receive the video information from the cameras in real time and search for the transmitted multi-channel video information; wherein the video receiving/search device includes a video search viewer configured to generate a thumbnail image and a metadata tag corresponding to an event of each channel based on video analysis information for each of the channels, display the generated thumbnail image and metadata tag, and search for the transmitted multi-channel video information.

The camera comprises: a metadata generator configured to generate video analysis information corresponding to the surveillance area as metadata; and a still image generator configured to generate a still image by cropping a video part corresponding to an identifiable object detected in the surveillance area among the video analysis information.

The plurality of thumbnail images corresponding to events generated for each channel are listed and displayed in the floating form on a screen provided by the video search viewer, and text-type metadata tags indicative of characteristics of an event corresponding to the respective thumbnail images is systematically displayed together around the respective thumbnail images.

A first thumbnail image corresponding to video data transmitted from a channel with a relatively high frequency of event occurrence among the respective thumbnail images is displayed further forward based on the depth direction of the screen.

When the thumbnail images are arranged based on the depth direction of the screen, the saturation, brightness, and effect of the thumbnail images are adjusted and displayed.

A menu bar configured to additionally search for event information of a channel corresponding to a predetermined thumbnail image selected from the thumbnail images is further displayed on the screen.

The metadata tag includes a plurality of metadata tags, and the plurality of metadata tags are displayed on the screen in different sizes of text indicated by the respective metadata tags.

The menu bar includes at least one item of a recent event, an event priority, and an event occurrence frequency.

The screen is divided into a first display screen and a second display screen, and the plurality of thumbnail images and the plurality of metadata tags are displayed on the first display screen, and video information corresponding to a channel corresponding to a thumbnail image selected by the user is displayed on the second display screen.

The video receiving/search device provides a user with a search function via the video information displayed on the second display screen.

When the metadata tag is selected by the user, the metadata tag and other metadata tags associated with the thumbnail image are displayed around the thumbnail image.

The other metadata tags are text of a sub-concept of the selected metadata tag.

The present disclosure provides a video receiving/search device configured to photograph a plurality of surveillance areas to acquire video information for the respective surveillance areas, connected via a network to a plurality of cameras configured to transmit the acquired video information for the respective surveillance areas to each channel to receive the video information from the cameras, and configured to search for the transmitted multi-channel video information, the device comprising: a metadata receiver configured to receive metadata generated by the plurality of cameras for each of the channels; a still image receiver configured to receive a still image generated by the plurality of cameras for each of the channels; a thumbnail image generator configured to generate a thumbnail image representing an event of the metadata from the received still image; a metadata tag generator configured to generate a metadata tag implemented with the text that expresses an event of the metadata from the received metadata; and a video search viewer configured to display the generated thumbnail image and metadata tag on a screen and provide a search function for the transmitted multi-channel video information.

The camera comprises: a metadata generator configured to generate video analysis information corresponding to the surveillance area as metadata; and a still image generator configured to generate a still image by cropping a video part corresponding to an identifiable object detected in the surveillance area among the video analysis information.

The plurality of thumbnail images corresponding to events generated for each channel are listed and displayed in the floating form on the screen provided by the video search viewer, and text-type metadata tags indicative of characteristics of an event corresponding to the respective thumbnail images is systematically displayed together around the respective thumbnail images.

A first thumbnail image corresponding to video data transmitted from a channel with a relatively high frequency of event occurrence among the respective thumbnail images is displayed further forward based on the depth direction of the screen.

When the thumbnail images are arranged based on the depth direction of the screen, the saturation, brightness, and effect of the thumbnail images are adjusted and displayed.

A menu bar configured to additionally search for event information of a channel corresponding to a predetermined thumbnail image selected from the thumbnail images is further displayed on the screen.

The metadata tag includes a plurality of metadata tags, and the plurality of metadata tags are displayed on the screen in different sizes of text indicated by the respective metadata tags.

The screen is divided into a first display screen and a second display screen, and the plurality of thumbnail images and the plurality of metadata tags are displayed on the first display screen, and video information corresponding to a channel corresponding to a thumbnail image selected by the user is displayed on the second display screen.

Advantageous Effects

The present disclosure describes that a still image of an identifiable specific area may be provided among video analysis information for a surveillance area, so that a client can more quickly and accurately search for video data of the surveillance area using image information without performing a separate video decoding procedure with a video receiving/search device.

In addition, surveillance videos for each channel transmitted from a plurality of network cameras and video analysis information corresponding thereto may be received, thumbnails and metadata tags for each channel are generated using the video analysis information, the thumbnails and metadata tags for each channel may be displayed on a video search viewer, thereby providing convenience to a user when analyzing surveillance videos.

MODE FOR DISCLOSURE

Figures 1, 2:
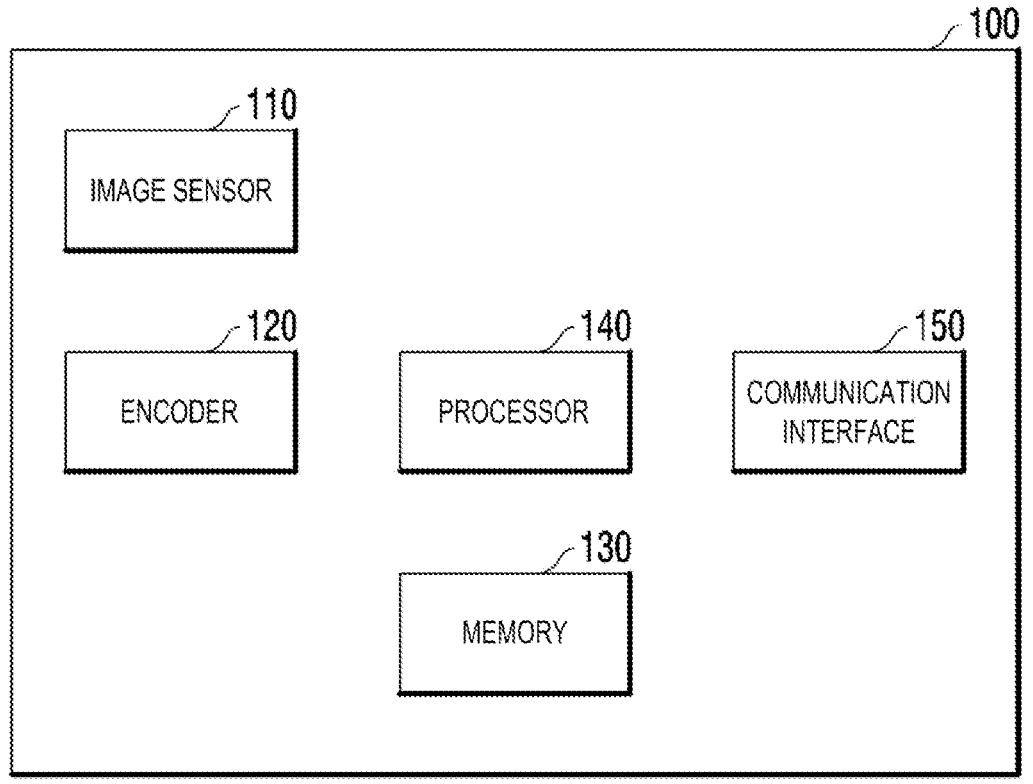
FIG. 1 is a block diagram schematically illustrating the configuration of a network surveillance camera system according to the present disclosure.
FIG. 2 is a block diagram illustrating the configuration of the camera illustrated in FIG. 1.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Each block in the accompanying block diagram may also be performed by computer program instructions (execution engines), and these computer program instructions may be mounted on a processor of a general-purpose computer, a special-purpose computer, or another programmable data processing equipment. Thus, the instructions executed through the processor of the computer or the another programmable data processing equipment generate means for performing functions described in each block of the block diagram.

These computer program instructions can also be stored in a computer-usable or computer-readable memory that can be directed to the computer or the another programmable data processing equipment in order to implement functions in a specific way. Therefore, the instructions stored in the computer-usable or computer-readable memory can also produce a manufacturing article including instruction means for performing the functions described in each block of the block diagram.

Furthermore, the computer program instructions may be mounted on the computer or the another programmable data processing equipment. Therefore, the instructions, which generate a process, in which a series of operation steps are performed on the computer or the another programmable data processing equipment and executed by the computer, and execute the computer or the another programmable data processing equipment, can also provide functions for performing the functions described in each block of the block diagram.

Furthermore, each block may represent a part of a module, a segment, or a code including one or more executable instructions for performing specific logical functions, and functions mentioned in blocks or steps can also occur out of order in some alternative embodiments.

That is, two blocks illustrated can also be executed at substantially the same time, and can also be executed in the reverse order of a corresponding function as necessary.

The terms used herein are for the purpose of not limiting but describing specific embodiments. Throughout the specification, when a certain part is referred to as "including" a certain component, it indicates that the part may not exclude but further include other components, unless otherwise stated. Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, an embodiment of the inventive concepts will be described in more detail with reference to the accompanying drawings.

FIG. 1 is a block diagram schematically illustrating the configuration of a network surveillance camera system according to the present disclosure.

Referring to FIG. 1, the network surveillance camera system according to the present disclosure may include a camera 100, a network 200, and a video receiving/search device 300. In the network surveillance camera system, video information acquired from the camera 100 may be transmitted to the video receiving/search device 300 via the network 200, and a manager may search for the transmitted multi-channel video information using the video receiving/search device 300. That is, in the present disclosure, the camera 100 may serve as a server that transmits data, and the video receiving/search device 300 may serve as a client that receives the transmitted data.

The camera 100 may acquire video and audio signals of the surveillance area by photographing the surveillance area, and may photograph the surveillance area in real time for the purpose of surveillance or security. In the present disclosure, a plurality of cameras 100 may be implemented, through which a plurality of surveillance areas may be photographed to acquire video information of each surveillance area, thus transmitting the acquired video information of each surveillance area to each channel. In other words, in the present disclosure, the plurality of cameras 100 may be implemented to perform an operation of acquiring the video information such as a video signal of the respective surveillance areas. That is, each of the plurality of cameras 100 may perform an operation to generate a multi-channel video signal corresponding to their respective surveillance areas and transmitting the multi-channel video signal.

The camera 100 may be a PTZ camera capable of panning and tilting and adjusting a zoom magnification of a lens, and the camera 100 may be a network camera configured to perform an intelligent video analysis function.

For example, the camera 100 according to the present disclosure may generate and transmit the video analysis information of the video information in the form of metadata in addition to the video information including the video signal corresponding to the surveillance area. The metadata may be written in a text format and implemented in a variety of forms interpretable by a system. For example, it may be implemented in a text format having rules such as XML or JSON or in a binary form defined by its own protocol.

The metadata may include object detection information (movement, sound, intrusion into a designated area, etc.), object identification information (person, car, face, hat, costume, etc.), unique identifier information of an object for tracking, location information (coordinates, size, etc.) of a detected object, and time information photographed in the surveillance area. The metadata may be transmitted to the video receiving device 300 via the network 200 in real time together with the video and audio signals detected in the surveillance area, and may be used for real-time control and video search, thus enhancing control convenience and search efficiency.

In another example, the camera 100 is a network camera configured to generate the video analysis signal by performing an intelligent video analysis function, but the operation of the network surveillance camera system according to the present disclosure is not limited thereto. For example, the camera 100 may transmit the video information corresponding to the respective surveillance areas, and the video receiving/search device 300 that has received the video information may analyze the video information and generate the video analysis information for the video information.

A camera 100 according to the present disclosure may generate the metadata and simultaneously capture a still image of a specific analysis area among the video analysis information, and transmit the same together in real time. For example, the still image may be implemented as a JPEG image file.

The camera 100 may transmit information to the video receiving device 300 using a variety of wired/wireless communication methods such as Ethernet, Wi-Fi, and bluetooth, or may receive an instruction from the video receiving/search apparatus 300.

The network 200 may include, for example, wired networks such as local area networks (LANs), wide area networks (WANs), metropolitan area networks (MANs), integrated service digital networks (ISDNs), or wireless networks such as wireless LANs, CDMA, bluetooth, and satellite communication, but the scope of the present disclosure is limited thereto.

The video receiving/search device 300 may perform an operation of receiving and storing video information for each channel transmitted from the cameras 100, and analyzing and monitoring the video information.

Although the video receiving/search device 300 is illustrated as one block in the following example, the configuration and operation of the video receiving/search device 300 according to the present disclosure are not limited thereto.

More specifically, the video receiving/search device 300 may implement the function of a video receiving device configured to receive and store data transmitted from the camera 100 and the function of a video search device configured to analyze and monitor the data. In that case, the video receiving device and the video search device may be physically separately configured, or may be implemented together via a single server system.

For example, the video receiving device may be implemented as a digital video recorder (VR), a network video recorder (NVR), or a video management system (VMS), and the video search device may be implemented as a separate device or application software configured to perform the function of using camera video data stored in the video receiving device and searching and analyzing the same. Accordingly, the manager may search for the transmitted multi-channel video information using the video receiving/search device 300.

In the present disclosure, the search for the multi-channel video information may be performed using a video search viewer provided by the video receiving/search device 300, and an example of a screen provided by the video search viewer will be described in more detail with reference to FIGS. 6 to 9.

Figure 3:
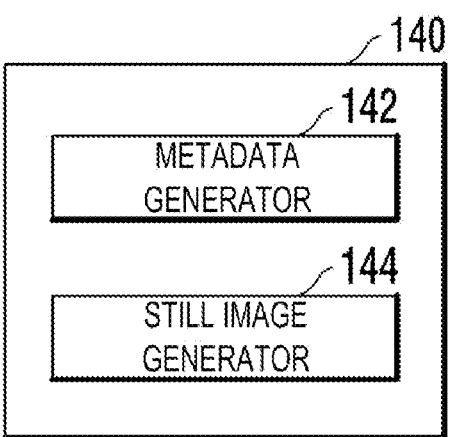
FIG. 3 is a block diagram illustrating an internal configuration of the processor illustrated in FIG. 2.

FIG. 2 is a block diagram illustrating the configuration of the camera illustrated in FIG. 1, and FIG. 3 is a block diagram illustrating an internal configuration of the processor illustrated in FIG. 2. As described above, the camera 100 illustrated in FIGS. 2 and 3 is described as an example of a network camera configured to generate the video analysis signal by performing the intelligent video analysis function, but an operation of the network surveillance camera system according to the present disclosure is not limited thereto.

First, referring to FIG. 2, the camera 100 includes an image sensor 110, an encoder 120, a memory 130, an event sensor 140, a processor 140, and a communication interface 150.

The image sensor 110 may perform the function of acquiring a video by photographing the surveillance area, and may be implemented as, for example, a charge-coupled device (CCD) sensor or a comprehensive metal-oxide-semiconductor (CMOS) sensor.

The encoder 120 performs an operation of encoding an image acquired via the image sensor 110 into a digital signal, which may comply with, for example, an H.264 standard, an H.265 standard, a moving picture experts group (MPEG) standard, a motion joint photographic experts group (M-JPEG) standard.

The memory 130 may store video data, voice data, still images, and metadata. As described above, the metadata may include object detection information (movement, sound, intrusion into a designated area, etc.), object identification information (person, car, face, hat, costume, etc.), and detected location information (coordinates, size, etc.) photographed in the surveillance area.

In addition, the still image is generated together with the metadata and stored in the memory 130, and may be generated by capturing image information on the specific analysis area among the video analysis information. For example, the still image may be implemented as a JPEG image file.

For example, the still image may be generated by cropping a specific area of the video data determined as an identifiable object among the video data of the specific area and the surveillance area detected during a specific period, which may be transmitted in real time together with the metadata.

The communication interface 150 transmits the video data, the voice data, the still image, and/or the metadata to the video receiving device 300. The communication interface 150 may transmit the image data, the voice data, the still images, and/or the metadata to the video receiving/search device 300 in real time. The communication interface 150 may perform at least one communication function among wired/wireless local area network (LAN), Wi-Fi, ZigBee, bluetooth, and a near field communication (NFC).

The processor 140 controls the overall operation of the camera 100, which may process an instruction of a computer program by performing basic arithmetic, logic, and input/output operations. The instruction may be provided to the processor 140 by the memory 130 or the communication interface 150. For example, the processor 140 may be implemented to execute the instruction received according to a program code stored in a storage device such as the memory 130. That is, the processor 140 may include a program module implemented with C, C++, Java, Visual Basic, or Visual C on the software level and configured to perform a variety of functions.

Referring to FIG. 3, the processor 140 of the network camera 100 according to the present disclosure may include a metadata generator 142 and a still image generator 144.

Herein, the processor 140 may be implemented to execute an instruction according to an operating system code included in the memory 130 and at least one program code, and in that case, components in the processor 140, i.e., the metadata generator 142 and the still image generator 144, may be understood as distinguishing and expressing different functions performed by the processor 140 by a control instruction provided by a program code stored in the camera 100.

The metadata generator 142 performs the function of generating the video analysis information corresponding to the surveillance areas of each camera in the form of metadata. The metadata of the surveillance area may include object detection information (movement, sound, intrusion into a designated area, etc.), object identification information (person, car, face, hat, costume, etc.), unique identifier information of an object for tracking, location information (coordinates, size, etc.) of the detected object, and time information. The metadata may be transmitted to the video receiving/search device 300 via the network 200 in real time together with the video and audio signals detected in the surveillance area and used for real-time control and video search to increase control convenience and search efficiency.

The processor 140 of the camera 100 according to the present disclosure may generate the metadata and simultaneously capture and generate the still image of the specific analysis area among the video analysis information via the still image generator 144. The still image generated via the still image generator 144 may be stored in the memory 130.

For example, the still image may be generated by cropping the specific area of the video data determined as an identifiable object among the video data of the specific area and the surveillance area detected during the specific period.

More specifically, the still image may be a still image generated by cropping a video part corresponding to an identifiable object detected in the surveillance area, which is a specific area among the video analysis information corresponding to the surveillance area prepared by the metadata.

That is, the still image capable of best representing a specific object among the video data photographed in the surveillance area may be selected as a "best shot" still image, which may be transmitted in real time together with the metadata. Accordingly, a client such as the video receiving/search device 300 may use the still image as a thumbnail image at the time of searching for the transmitted video data without performing separate video processing such as decoding.

Figure 4:
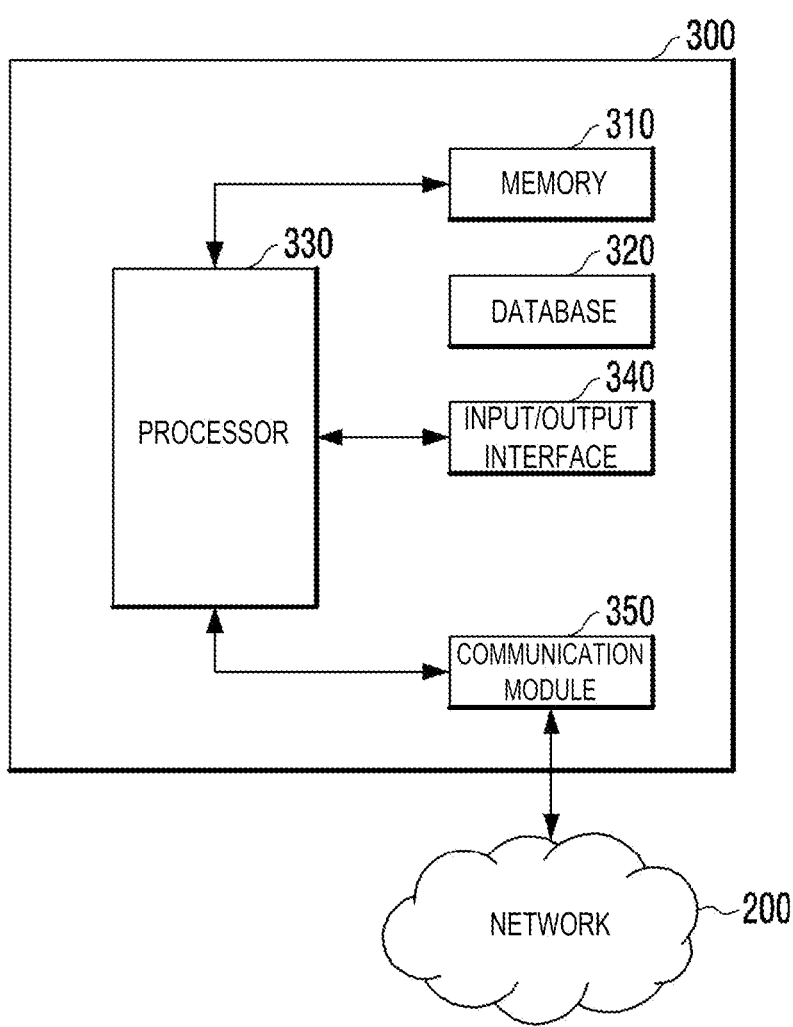
FIG. 4 is a block diagram illustrating the configuration of a video receiving/search device illustrated in FIG. 1.
Figure 5:
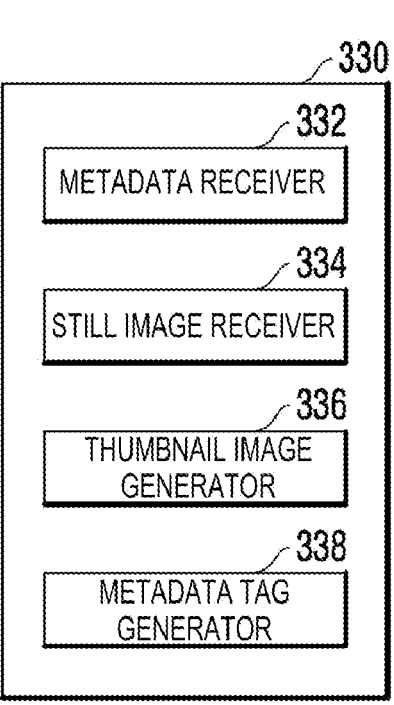
FIG. 5 is a block diagram illustrating an internal configuration of the processor illustrated in FIG. 4.

FIG. 4 is a block diagram illustrating the configuration of a video receiving/search device illustrated in FIG. 1, and FIG. 5 is a block diagram illustrating an internal configuration0 of the processor illustrated in FIG. 4.

The video receiving/search device 300 may serve as a client that receives and stores data transmitted from the camera 100, and analyzes and monitors the same. For example, the video receiving/search device 300 may implement a video receiving function of receiving multi-channel video information from the cameras 200 and a video search function of analyzing and searching for the received multi-channel video information, and specifically, the video search function may operate by mounting an application program (video search viewer) capable of implementing such a function in a server system constituting the video receiving device. However, this is one example and, as described above, the video receiving/search device 300 may be implemented even with a configuration separated into a video receiving device and a video search device, respectively.

The video search viewer as illustrated in FIGS. 6 to 9 may be provided via the application program configured to perform the view search function, and accordingly, the manager may search for the transmitted multi-channel video information using the video receiving/search device 300.

Referring to FIG. 4, the video receiving/search device 300 according to the present disclosure includes a memory 310, a database 320, a processor 330, a communication module 350, and an input/output interface 340.

As the memory 310 is a computer-readable recording medium, it may include permanent mass storage devices such as a RAM, a ROM, and a disk drive. The memory 310 may store signals transmitted from the camera 100 illustrated in FIG. 1, such as, video data, voice data, still images and metadata, which correspond to the surveillance area of the camera.

The database 320 may store and maintain unique information (e.g., a camera ID, etc.) of the camera 100 illustrated in FIG. 1. That is, when surveillance cameras connected to the video receiving apparatus 300 are added and/or changed, information corresponding thereto may also be updated in the database 320.

The processor 330 may process an instruction of a computer program by performing basic arithmetic, logic, and input/output operations. The instruction may be provided to the processor 330 by the memory 310 or the communication module 350. For example, the processor 330 may be implemented to execute the instruction received according to a program code stored in a storage device such as the memory 310. That is, the processor 330 may include a program module implemented with C, C++, Java, Visual Basic, or Visual C on a software level and configured to perform a variety of functions.

The communication module 350 may provide the function of communicating with the camera 100 via the network 200. For example, control signals and instructions provided under the control of the processor 330 of the video receiving/search device 300 may be transmitted to the camera 100 over the network 200 via the communication module 350, and similarly, photographed video information and/or location information generated by the camera 100 may be transmitted to the video receiving/search device 300 over the network 200.

The input/output interface 340 may serve to provide an interface between an input device implemented with a keyboard or a mouse and an output device such as a display.

Referring to FIG. 5, the processor 330 of the video receiving/search apparatus 300 according to the present disclosure may include a metadata receiver 332, a still image receiver 334, a thumbnail image generator 336, and a metadata tag generator 338.

Herein, the processor 330 may be implemented to execute an instruction according to an operating system code included in the memory 310 and at least one program code, and in that case, components in the processor 330, i.e., the metadata receiver 332, the still image receiver 334, the thumbnail image generator 336, and the metadata tag generator 338, may be understood as distinguishing and expressing different functions performed by the processor 330 by a control instruction provided by a program code stored in the video receiving/search device 300.

The metadata receiver 332 is a function block interacting with the metadata generator 142, which is a function block in the processor 140 of the camera 100 described above with reference to FIG. 3, and performs the function of receiving the metadata generated and transmitted by the metadata generator 142.

When an event occurs for each channel among the surveillance videos photographed in the surveillance areas for each channel of the respective cameras, the metadata may include object detection information (movement, sound, intrusion into a designated area, etc.), object identification information (person, car, face, hat, costume, etc.), unique identifier information of an object for tracking, location information (coordinates, size, etc.) of a detected object, and time information photographed in the surveillance area.

The still image receiver 334 is a function block interacting with the metadata generator 144, which is a function block in the processor 140 of the camera 100 described above with reference to FIG. 3, and performs the function of receiving the still image generated and transmitted by the metadata generator 144. For example, the still image may be generated by cropping the specific area of video data determined as an identifiable object among the video data of the specific area and the surveillance area detected during the specific period. More specifically, the still image may be a still image generated by cropping a video part corresponding to an identifiable object detected in the surveillance area, which is a specific area among video analysis information corresponding to the surveillance area prepared by the metadata. That is, the still image capable of best representing a specific object among the video data photographed in the surveillance area may be selected as a "best shot" still image.

The thumbnail image generator 336 performs the function of generating the thumbnail image using the still image received via the still image receiver 334. The thumbnail image may be generated using an image capable of best representing an event during occurrence of the event among the video information corresponding to the surveillance areas transmitted for each channel, i.e., the "best shot" still image, and a user may more easily search for event information for each channel displayed as the thumbnail image in the video search viewer described above.

Similarly, the metadata tag generator 338 performs the function of generating a metadata tag using the metadata received via the metadata receiver 332. The metadata tag is generated based on the metadata corresponding to the event during occurrence of the event among the video information corresponding to the surveillance area transmitted for each channel, and may be implemented with at least one text that intuitively expresses the event. In the video search viewer described above, the user may easily search for event information for each channel by using the metadata tags displayed around the thumbnail image besides the thumbnail image.

Figure 6:
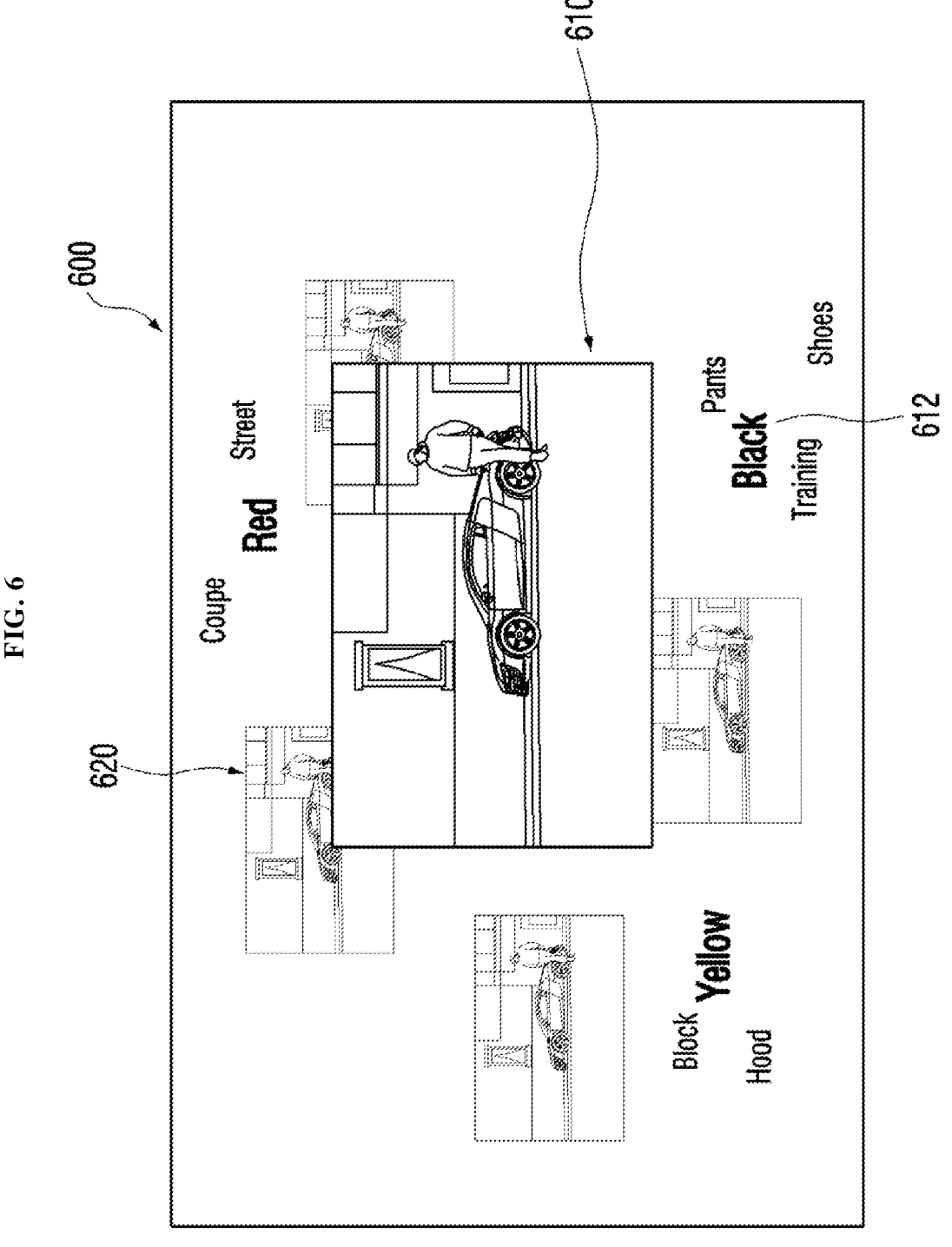
FIG. 6 is a diagram illustrating a first embodiment of a video search viewer provided by the video receiving/search device according to the present disclosure.

FIG. 6 is a diagram illustrating a first embodiment of the video search viewer provided by the video receiving/search device according to the present disclosure. That is, FIG. 6 illustrates an example of a function provided by an application program (video search viewer) that implements the video search function of the video receiving/search device configured to perform an analysis and search for received multi-channel video information.

Specifically, FIG. 6 illustrates a screen 600 corresponding to the first embodiment of the video search viewer capable of searching for the multi-channel video information received from a plurality of cameras.

Referring to FIG. 6, a plurality of thumbnail images 610 and 620 corresponding to events generated for each channel are listed and displayed in the floating form on the screen 600 of the video search viewer.

In addition, a text-type metadata tag 612 indicative of characteristics of an event corresponding to each of the thumbnail images 610 and 620 may be systematically displayed together around the respective thumbnail images.

Referring to FIG. 6, with respect to video information of a channel represented by the first thumbnail image 610, the metadata tag generated based on the metadata of the channel may be "Black, Pants, Training, and Shoes", which are words indicative of characteristics of an object included in the first thumbnail image 610.

In the present disclosure, a method displayed in the front (z-axis direction) of the screen may be used so that the thumbnail image corresponding to video data transmitted from a channel with a relatively high frequency of event occurrence among the respective thumbnail images may be more exposed to the user. FIG. 6 illustrates that an event occurrence frequency of a channel corresponding to the first thumbnail image 610 is relatively higher than that of channels corresponding to other thumbnail images 620.

Referring to FIG. 6, it may be seen that the first thumbnail image 610 displayed in the front of the screen 600 (in a z-axis outer direction) is displayed relatively larger and clearer than other thumbnail images 620. On the other hand, when other thumbnail images 620 are displayed behind the screen 600 (in a z-axis inner direction), they are displayed relatively small and blurred as compared to the first thumbnail image 610, so that the user may visually recognize the thumbnail image 610 corresponding to a channel having a high event occurrence frequency.

In other words, when the plurality of thumbnail images 610 and 620 corresponding to the events generated for each channel are displayed in the floating form via the screen 600 of the video search viewer according to the present disclosure, the thumbnail images may be arranged by expressing the depth differently based on the z-axis of the screen according to the event occurrence frequency of the channel corresponding to the thumbnail images.

In addition, when the thumbnail images are arranged based on the z-axis of the screen, the saturation, brightness, and effect of the thumbnail image may be adjusted and displayed. Accordingly, as illustrated in FIG. 6, the first thumbnail image 610 may be implemented to have a clearer saturation and brightness compared with other thumbnail images 620.

Figure 7:
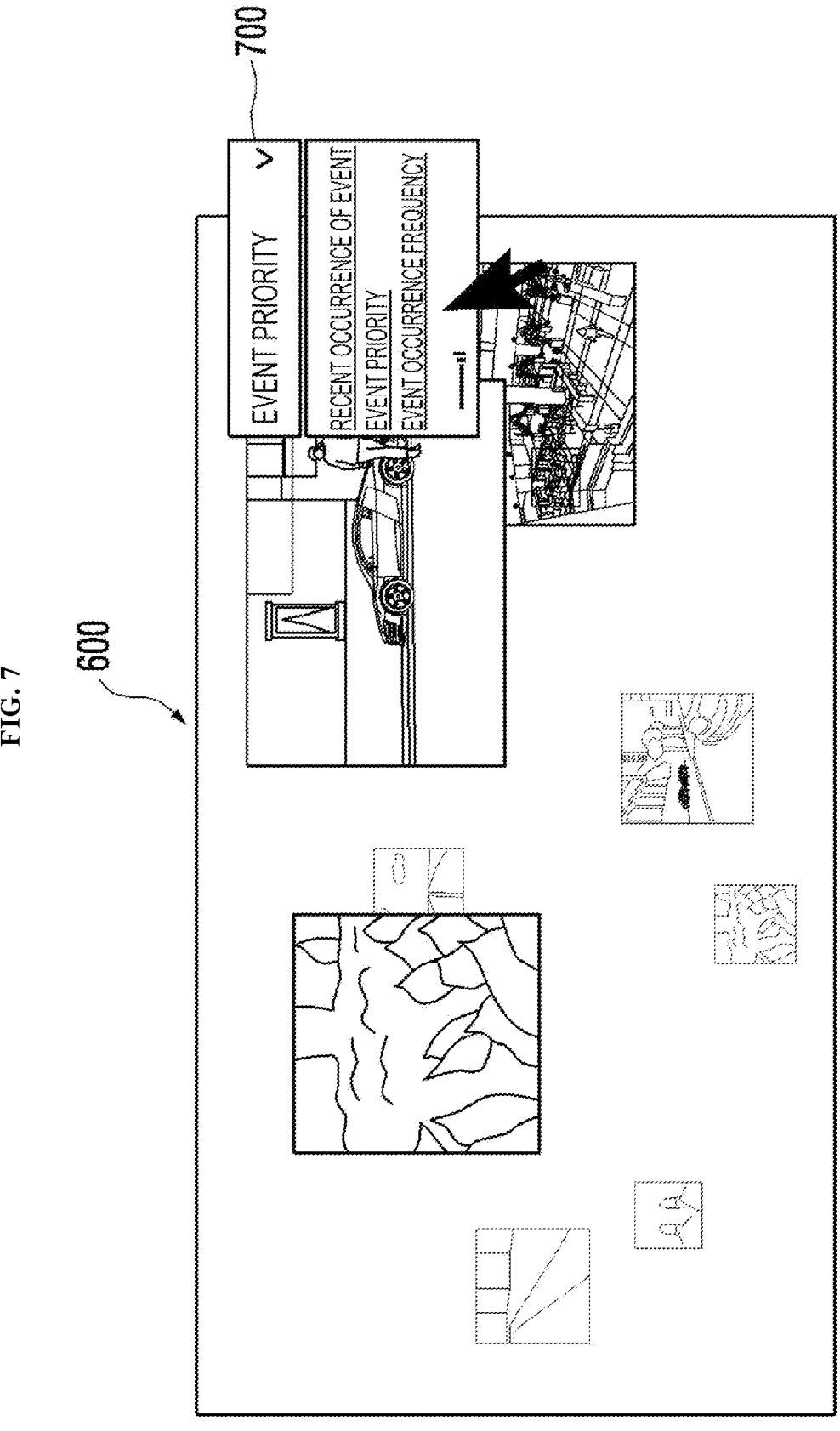
FIG. 7 is a diagram illustrating a second embodiment of the video search viewer provided by the video receiving/search device according to the present disclosure.

FIG. 7 is a diagram illustrating a second embodiment of the video search viewer provided by the video receiving/search device according to the present disclosure.

The video search viewer according to the second embodiment of the present disclosure operates identically to the screen 600 of the first embodiment illustrated in FIG. 6; however, differently from FIG. 6, FIG. 7 describes an example of an operation when the user selects a specific thumbnail image.

As illustrated in FIG. 7, when the user clicks and selects the specific thumbnail image (e.g., the first thumbnail image), a menu bar 700 capable of searching for detailed information of an event corresponding to the thumbnail image selected by the user may be displayed.

Referring to FIG. 7, the menu bar 700 may include "a recent event, an event priority, and an event occurrence frequency".

Figure 8:
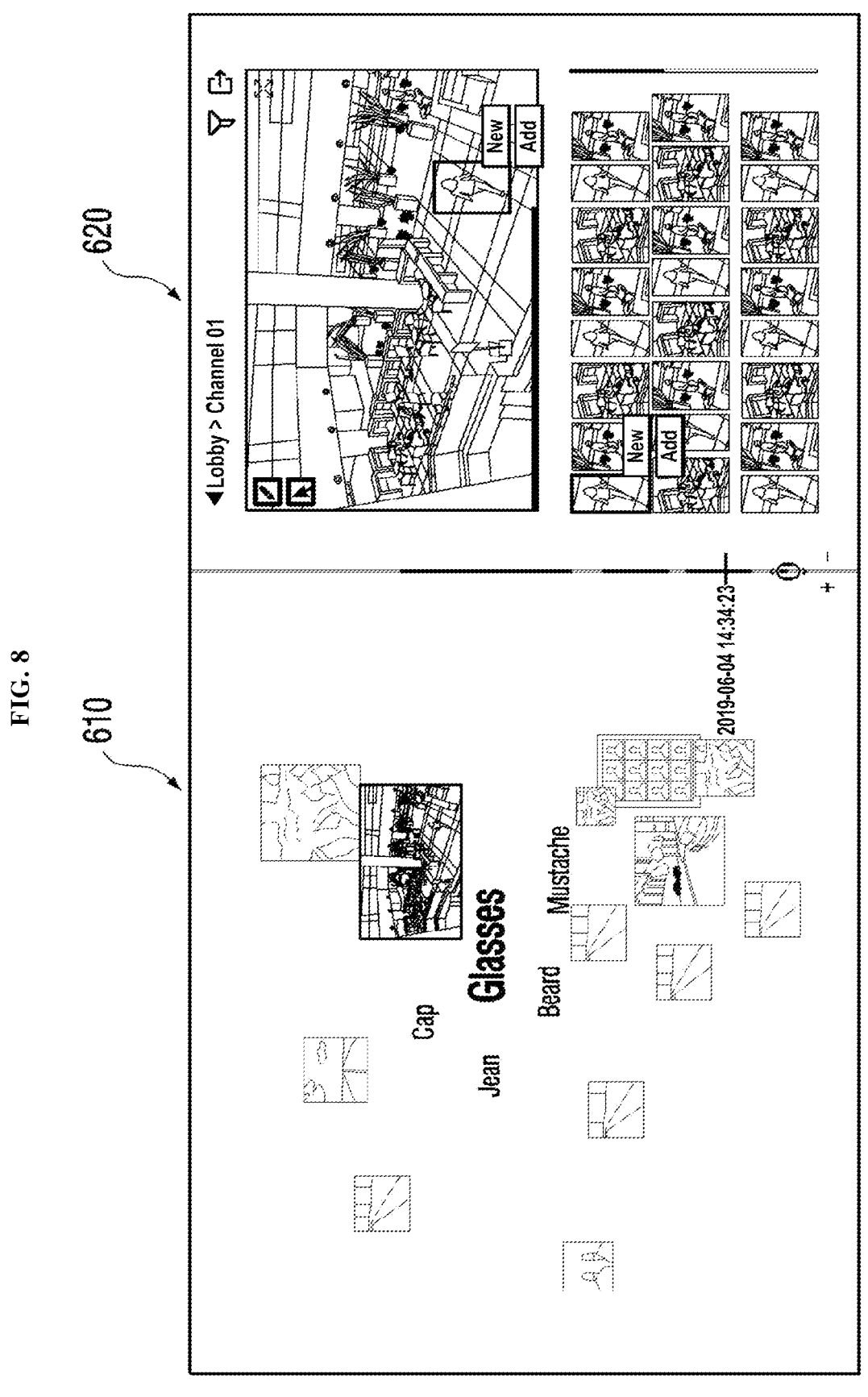
FIG. 8 is a diagram illustrating a third embodiment of the video search viewer provided by the video receiving/search device according to the present disclosure.

FIG. 8 is a diagram illustrating a third embodiment of the video search viewer provided by the video receiving/search device according to the present disclosure.

The video search viewer according to the third embodiment of the present disclosure is displayed by being divided into the first display screen 610 and the second display screen 620 unlike the screen 600 of the first embodiment illustrated in FIG. 6, and the first display screen 610 provides the same function as the screen 600 of the first embodiment illustrated in FIG. 6. When the user selects the specific thumbnail image on the first display screen 610, differently from FIG. 6, FIG. 8 describes that the second display screen 620 operates in association therewith.

As illustrated in FIG. 8, when the user clicks and selects the specific thumbnail image on the first display screen 610, video information corresponding to a channel corresponding to the thumbnail image selected by the user may be displayed on the second display screen 620, and the user may perform new searches or additional searches via the video information provided by the corresponding channel through the second display screen 620.

Figure 9:
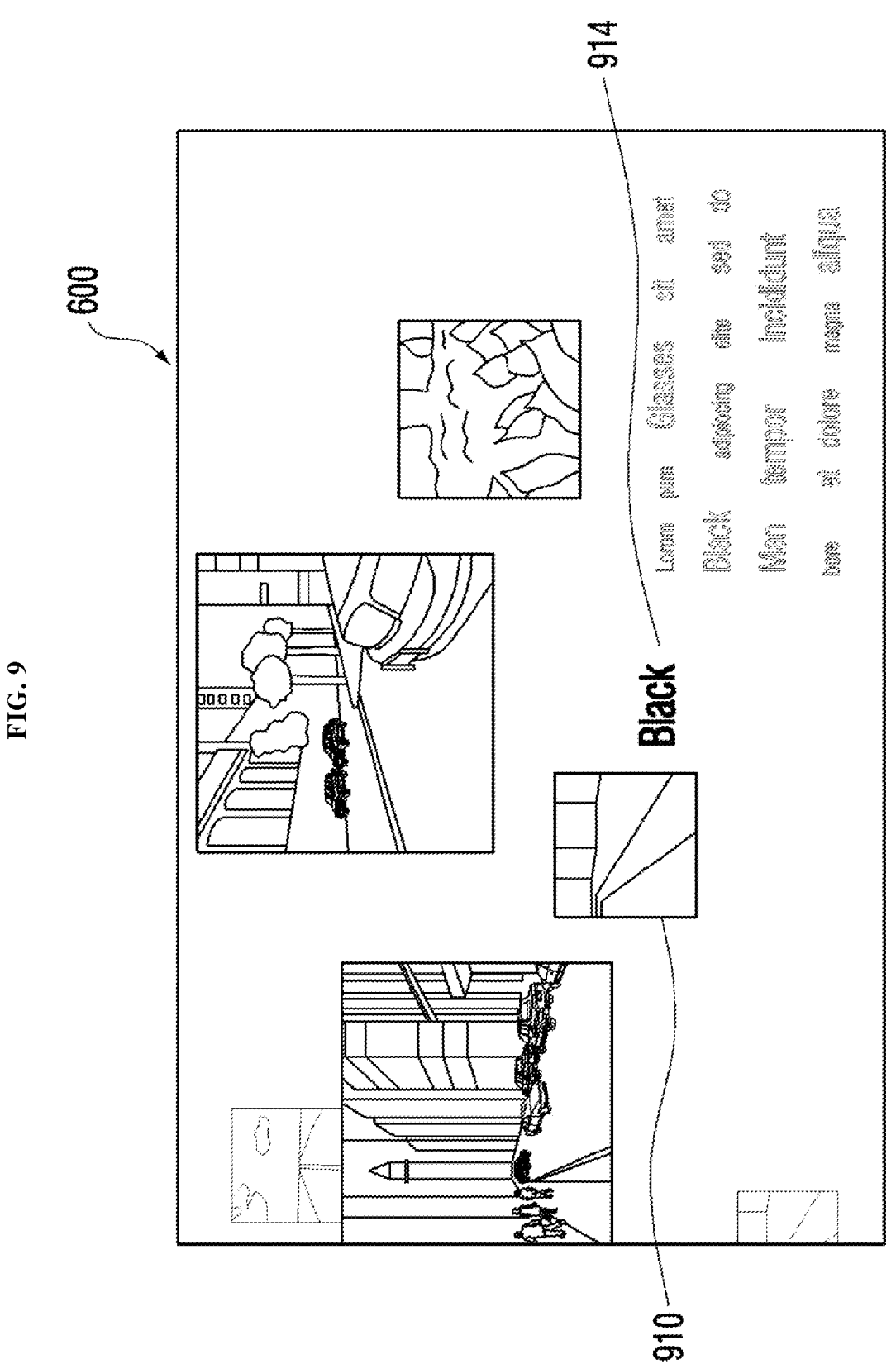
FIG. 9 to FIG. 11 are diagrams describing an operation of the video search viewer provided by the video receiving/search device according to a fourth embodiment of the present disclosure.
Figure 10:
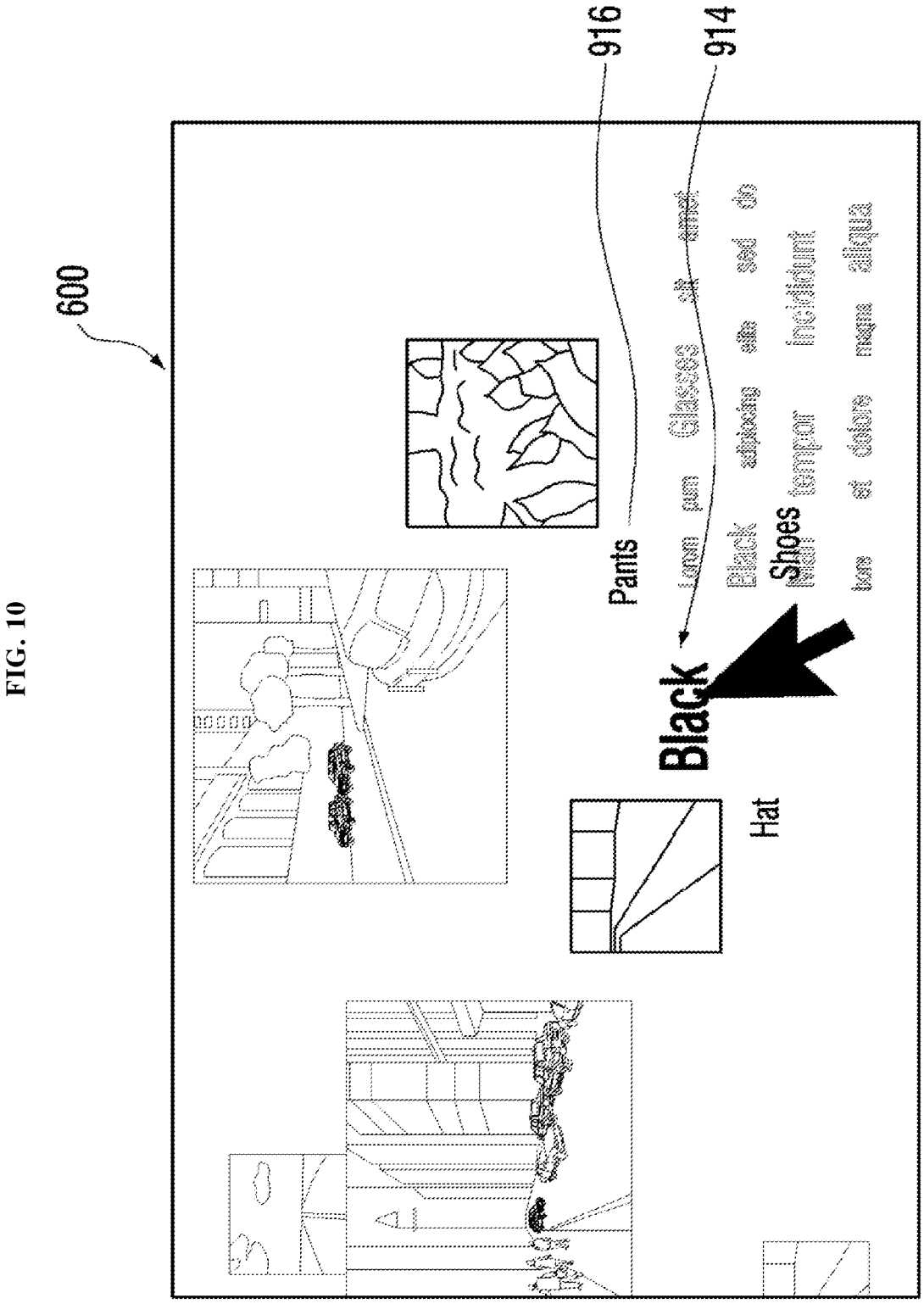
Figure 11:
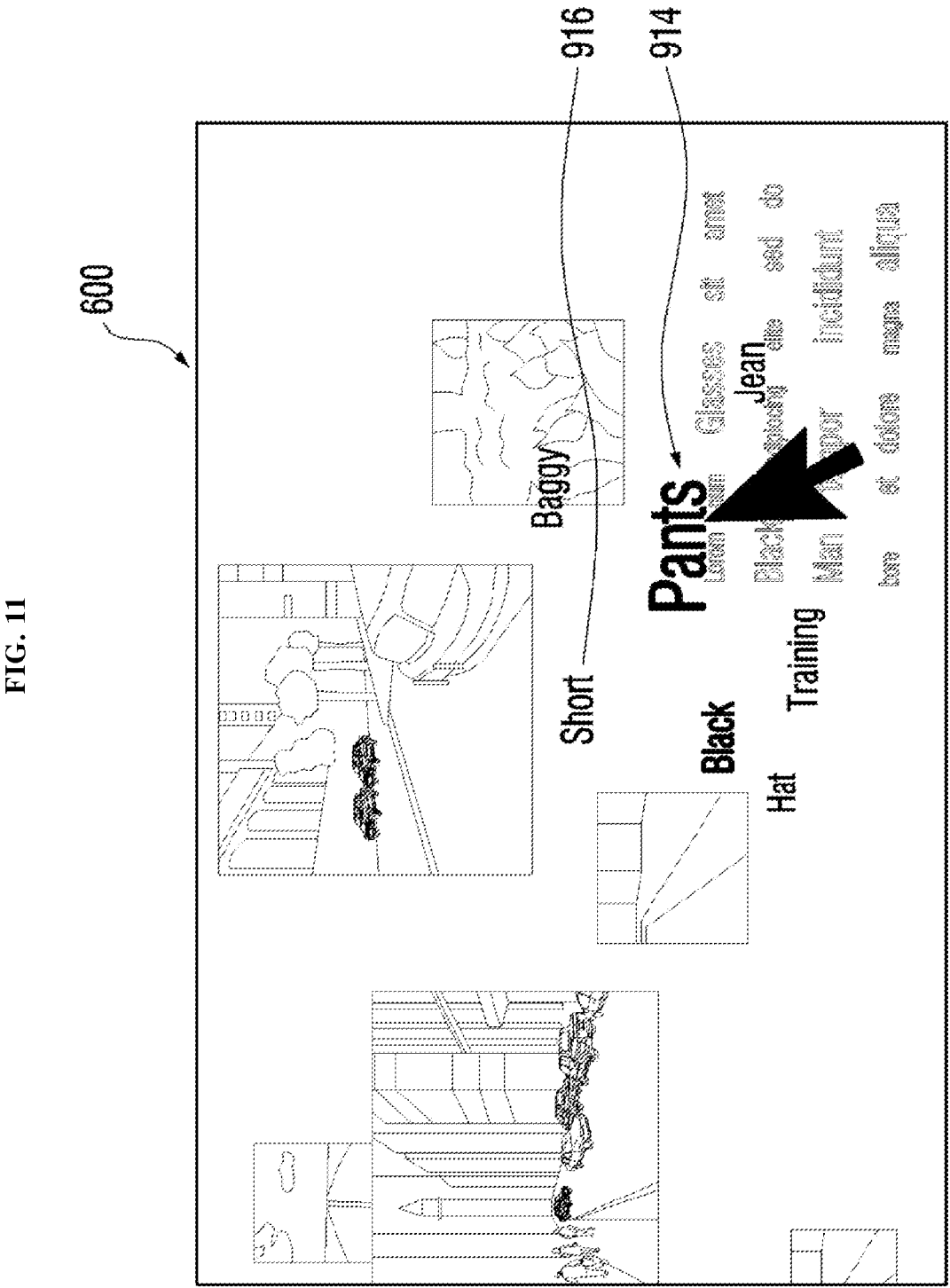

FIGS. 9 to 11 are diagrams illustrating an operation according to a fourth embodiment of the video search viewer provided by the video receiving/search device according to the present disclosure.

The video search viewer according to the fourth embodiment of the present disclosure operates identically to the screen 600 of the first embodiment shown in FIG. 6, but in FIGS. 9 to 11, differently from FIG. 6, FIGS. 9 to 11 describe an example of an operation when the user selects the metadata tag corresponding to the specific thumbnail image.

First, as illustrated in FIG. 9, a plurality of thumbnail images 910 and a plurality of metadata tags 912 corresponding to the events generated for each channel are arranged and displayed in the floating form on the screen 600 of the video search viewer.

In this case, when the user clicks and selects "Black" which is the metadata tag 912 corresponding to the specific thumbnail image 910, "Pants, Hat, and Shoes" is generated around the thumbnail image 910 as the selected tag 912 and other metadata tags 914 associated with the thumbnail image 910, as illustrated in FIG. 10.

Then, when the user clicks and selects "Pants" from the newly generated associated metadata tags 914, "Short, Baggy, Jean, and Training" is generated around the thumbnail image 910 as the selected tag 914 and other metadata tags 916 associated with thumbnail image 910, as illustrated in FIG. 11.

In this way, as an environment where the user may continuously select the metadata tags, i.e., an additional associated search image or text-type metadata tags may be displayed, the user can more easily and quickly access the results he/she desires to find.

While having been described herein, specific embodiments and application examples have been provided to merely help more general understanding of the present disclosure, and the present disclosure is not limited to the embodiments. A person having ordinary knowledge in the art to which the present disclosure pertains may change or modify the present disclosure in various ways based on the foregoing description.

Accordingly, the spirit of the present disclosure should not be determined based on only the described embodiments, and all changes equivalents to the claims and equivalent modifications thereof may be construed as belonging to the category of the spirit of the present disclosure.

The invention claimed is:

1. A network surveillance camera system comprising:

a plurality of cameras configured to photograph a plurality of surveillance areas to acquire video information for the respective surveillance areas and transmit the acquired video information of each surveillance area to each channel;

a video receiving/search device connected to the plurality of cameras via a network;

the video receiving/search device configured to receive the video information from the cameras in real time and search for the transmitted multi-channel video information;

the video receiving/search device including a video search viewer;

the video search viewer configured to generate a thumbnail image and a metadata tag corresponding to an event of each channel based on video analysis information for each of the channels, display the thumbnail image and the metadata tag, and search for the transmitted multi-channel video information;

wherein the thumbnail image including a plurality of thumbnail images corresponding to events generated for each channel are listed and displayed in floating form on a screen provided by the video search viewer, and text-type metadata tags indicative of characteristics of an event corresponding to the respective thumbnail images is systematically displayed together around the respective thumbnail images; and wherein a first thumbnail image corresponding to video data transmitted from a channel with a higher frequency of event occurrence among the respective thumbnail images is displayed further forward based on the depth direction of the screen.

2. The network surveillance camera system of claim 1, wherein the camera comprises:

a metadata generator generating video analysis information corresponding to the surveillance area as metadata; and a still image generator generating a still image by cropping a video part corresponding to an identifiable object detected in the surveillance area among the video analysis information.

3. The network surveillance camera system of claim 1, wherein the thumbnail images are arranged based on the depth direction of the screen, and wherein the saturation, brightness, and effect of the thumbnail images are adjusted and displayed.

4. The network surveillance camera system of claim 3, wherein a menu bar is further displayed on the screen to additionally search for event information of a channel corresponding to a predetermined thumbnail image selected from the thumbnail images.

5. The network surveillance camera system of claim 4, wherein the menu bar includes at least one item from among a recent event, an event priority, and an event occurrence frequency.

6. The network surveillance camera system of claim 1, wherein the metadata tag includes a plurality of metadata tags, and the plurality of metadata tags are displayed on the screen in different sizes of text indicated by the respective metadata tags.

7. The network surveillance camera system of claim 1, wherein the screen is divided into a first display screen and a second display screen, and the plurality of thumbnail images and the plurality of metadata tags are displayed on the first display screen, and video information corresponding to a channel corresponding to a thumbnail image selected by the user is displayed on the second display screen.

8. The network surveillance camera system of claim 7, wherein the video receiving/search device provides a user with a search function via the video information displayed on the second display screen.

9. The network surveillance camera system of claim 1, wherein selection of the metadata tag, by the user, displays the metadata tag and other metadata tags associated with the thumbnail image around the thumbnail image.

10. The network surveillance camera system of claim 9, wherein the other metadata tags are text of a sub-concept of the selected metadata tag.

11. A video receiving/search device configured to photograph a plurality of surveillance areas to acquire video information for the respective surveillance areas, connected via a network to a plurality of cameras configured to transmit the acquired video information of the respective surveillance areas to each channel to receive the video information from the cameras, and configured to search for the transmitted multi-channel video information, the device comprising:

a metadata receiver receiving metadata generated by the plurality of cameras for each of the channels;

a still image receiver receiving a still image generated by the plurality of cameras for each of the channels;

a thumbnail image generator generating a thumbnail image representing an event of the metadata from the received still image;

a metadata tag generator generating a metadata tag implemented with text that expresses an event of the metadata from the received metadata;

a video search viewer displaying the generated thumbnail image and metadata tag on a screen and providing a search function for the transmitted multi-channel video information;

wherein the plurality of thumbnail images corresponding to events generated for each channel are listed and displayed in floating form on the screen provided by the video search viewer, and text-type metadata tags indicative of characteristics of an event corresponding to the respective thumbnail images is systematically displayed together around the respective thumbnail images; and wherein a first thumbnail image corresponding to video data transmitted from a channel with a higher frequency of event occurrence among the respective thumbnail images is displayed further forward based on the depth direction of the screen.

12. The video receiving/search device of claim 11, wherein the camera comprises:

a metadata generator generating video analysis information corresponding to the surveillance area as metadata; and a still image generator generating a still image by cropping a video part corresponding to an identifiable object detected in the surveillance area among the video analysis information.

13. The video receiving/search device of claim 11, wherein the thumbnail images are arranged based on the depth direction of the screen, and wherein the saturation, brightness, and effect of the thumbnail images are adjusted and displayed.

14. The video receiving/search device of claim 13, wherein a menu bar is further displayed on the screen to additionally search for event information of a channel corresponding to a predetermined thumbnail image selected from the thumbnail images.

15. The video receiving/search device of claim 11, wherein the metadata tag includes a plurality of metadata tags, and the plurality of metadata tags are displayed on the screen in different sizes of text indicated by the respective metadata tags.

16. The video receiving/search device of claim 11, wherein the screen is divided into a first display screen and a second display screen, and the plurality of thumbnail images and the plurality of metadata tags are displayed on the first display screen, and video information corresponding to a channel corresponding to a thumbnail image selected by the user is displayed on the second display screen.

* * * * *